US005682087A

United States Patent [19]

Lyon et al.

[11] Patent Number: 5,682,087

[45] Date of Patent: Oct. 28, 1997

[54] CATHODE CURRENT STABILIZATION

[75] Inventors: John Jeffery Lyon, San Marcos; Richard Filia; Joe E. Deavenport, both of San Diego, all of Calif.

[73] Assignee: Hughes-JVC Technology Corporation, Carlsbad, Calif.

[21] Appl. No.: 537,431

[22] Filed: Oct. 2, 1995

Related U.S. Application Data

[63] Continuation of Ser. No. 401,549, Mar. 9, 1995, abandoned.

[51] Int. Cl.[6] .................. G01S 3/16; G01S 3/28

[52] U.S. Cl. .................. 315/383; 315/381

[58] Field of Search .................. 315/383, 381

[56] References Cited

U.S. PATENT DOCUMENTS 4,461,983 7/1984 Lees .................. 315/383

4,705,992 11/1987 Ciocan .................. 315/383

5,077,502 12/1991 Shaklee et al. .................. 315/383

*Primary Examiner*—Theodore M. Blum

*Attorney, Agent, or Firm*—Harness, Dickey & Pierce, P.L.C.

[57] ABSTRACT

A CRT compensation system (10) is disclosed which utilizes a cathode stabilizer circuit (16) to correct a cathode current $I_k$ which deviates from an ideal transfer function. The cathode stabilizer circuit (16) takes the cathode voltage $V_K$ and the cathode current $I_K$ and removes the ideal gamma transfer function from $I_K$ to produce a linear output. This linear output is then subtracted from the cathode voltage $V_K$ to produce an error voltage $V_{err}$ which is used to adjust the CRT drive to minimize the error in the cathode current. For example the $V_{err}$ the error voltage may be utilized to change the voltage level of the grid one element of the CRT (14). As a result, the CRT (14) will more closely approximate the ideal transfer function. The system (10) operates continuously and thus is able to correct for short term cathode current effects on a real time basis.

17 Claims, 4 Drawing Sheets

| TIME | RED NO CORRECTION | GRN NO CORRECTION | BLU NO CORRECTION | RED W/ CORRECTION | GRN W/ CORRECTION | BLU W/ CORRECTION |
|---|---|---|---|---|---|---|
| 0 | 0.53 | 0.54 | 0.4 | 0.3726 | 0.3728 | 0.2818 |
| 0.5 | 0.45 | 0.44 | 0.31 | 0.3722 | 0.3721 | 0.2808 |
| 1 | 0.42 | 0.418 | 0.294 | 0.3717 | 0.3718 | 0.2805 |
| 1.5 | 0.401 | 0.401 | 0.281 | 0.3717 | 0.3717 | 0.2803 |
| 2 | 0.388 | 0.385 | 0.2706 | 0.3715 | 0.3715 | 0.2802 |
| 2.5 | 0.3795 | 0.3787 | 0.268 | 0.3713 | 0.3714 | 0.2803 |
| 3 | 0.3746 | 0.3743 | 0.2631 | 0.3715 | 0.3715 | 0.2802 |
| 3.5 | 0.3701 | 0.3696 | 0.2602 | 0.3716 | 0.3715 | 0.2803 |
| 4 | 0.3669 | 0.3666 | 0.2584 | 0.3717 | 0.3716 | 0.2804 |
| 5 | 0.3629 | 0.3628 | 02558 | 0.3719 | 0.3719 | 0.2804 |
| 6 | 0.3604 | 0.3604 | 0.2545 | 0.3721 | 0.372 | 0.2806 |
| 7 | 0.3598 | 0.3598 | 0.254 | 0.3724 | 0.3724 | 0.2807 |
| 8 | 0.3591 | 0.3591 | 0.2536 | 0.3725 | 0.3724 | 0.2808 |
| 9 | 0.3591 | 0.3591 | 0.2534 | 0.3726 | 0.3725 | 0.2809 |
| 10 | 0.3591 | 0.359 | 0.2536 | 0.3727 | 0.37 | 0.281 |
| 11 | | | | | | |
| 12 | | | | | | |
| 13 | | | | | | |
| 14 | | | | | | |
| 15 | 0.3673 | 0.3674 | 0.2583 | 0.3705 | 0.3706 | 0.2802 |
| 15.5 | 0.3655 | 0.3652 | 0.258 | 0.3713 | 0.3712 | 0.2805 |
| 16 | 0.3638 | 0.3636 | 0.2574 | 0.3714 | 0.3713 | 0.2804 |
| 16.5 | 0.3627 | 0.3626 | 0.2569 | 0.3714 | 0.3713 | 0.2805 |
| 17 | 0.3619 | 0.3617 | 0.2567 | 0.3713 | 0.3712 | 0.2805 |
| 17.5 | 0.3613 | 0.3614 | 0.2566 | 0.3714 | 0.3714 | 0.2805 |
| 18 | 0.3609 | 0.3609 | 0.2561 | 0.3714 | 0.3714 | 0.2805 |
| 18.5 | 0.3609 | 0.3608 | 0.2561 | 0.3716 | 0.3715 | 0.2805 |
| 19 | 0.3607 | 0.3608 | 0.2561 | 0.3717 | 0.3716 | 0.2806 |
| 19.5 | 0.3603 | 0.3602 | 0.2559 | 0.372 | 0.3719 | 0.2806 |
| 20 | 0.3604 | 0.3603 | 0.2561 | 0.3721 | 0.372 | 0.2806 |
| 20.5 | 0.3605 | 0.3605 | 0.2559 | 0.3721 | 0.372 | 0.2807 |
| 21 | 0.3605 | 0.3605 | 0.2558 | 0.3723 | 0.3721 | 0.2808 |

Fig-4A

CATHODE CURRENT STABILIZATION

This is a continuation of U.S. patent application Ser. No. 08/401,549, filed Mar. 9, 1995, now abandoned.

BACKGROUND OF THE INVENTION

1. Technical Field

The present invention relates to compensation and stabilization systems for cathode rays tubes (CRTs) and more particularly to a CRT stabilization system which continuously corrects the CRT transfer function to more closely approximate the ideal transfer function.

2. Discussion

CRT's have wide applications in many areas including conventional televisions, computer screens, various kinds of display devices and image projection systems. Ideally, a CRT will produce a cathode current in response to an input voltage that can be described by the expression $I_K=A*(V_K)^{(2.2)}$, where $I_K$ is the measured cathode current, A is an amplification factor and $V_K$ is the input video voltage.

However, actual CRT's will often not follow this ideal transfer function. This may occur as a result of the CRT aging or in some cases because the cathode is improperly activated. As a result, the cathode may not supply electrons in the desired manner. In one condition, called a slumping cathode, a cathode may supply the proper level of electrons only for a short period of time but the cathode current will then degrade over time. This results in a variable activation of the cathode. Another problem which causes a CRT to deviate from the ideal cathode current results from thermal expansion inside the gun structure of the CRT. This causes slight movement in the control grids and changes the distance from the cathode, and thus the electrical potential which the grid exerts on the cathode.

In many applications minor deviations in the cathode current from the ideal cathode transfer function can be tolerated. For example, in computer screens used primarily for word processing, and in low end commercial televisions, the above described variations may not become noticeable. However, in many applications it is desirable to correct for the above described effects. For example, even small variations in the cathode current are not acceptable in applications such as high end television, medical display applications and high resolution computer graphic systems. Another result from the above described cathode current problem is poor gamma tracking between colors in three color CRT systems. For example, in three color liquid crystal light valve projections systems three separate CRT's (one for each color) generate the gray scale image for amplification by a liquid crystal light valve light amplifier. However, if the three CRT's don't all have the same transfer function the sum of the three outputs together may result in distortions which result in more red or green or blue from some of the CRT's. Because of this problem sometimes individual CRT units are simply not useable in critical applications such as liquid crystal light valve projectors.

In order to correct for improper CRT cathode currents, one solution is to change the potential on one of the control grids in the CRT. For example, where a cathode is not generating enough electrons, a higher potential placed on a control grid will push the cathode harder to emit the desired level of electrons. Likewise, in some cases it will be desirable to decrease voltage on the grid to reduce the cathode current.

In order to bring about the proper amount of change in the cathode current, some prior cathode compensation systems have utilized sampling intervals. In this approach reference video levels are inserted into the video signal during blanking intervals. These systems are inherently non-continuous in operation. That is, they will sense how much additional output current is necessary to make the correction and will inject at the end of a picture scan at the bottom of the picture a few extra scan lines. This will insert a defined amount of drive to alter the cathode current in the desired manner. However, because its a sampled non-continuous process if the cathode activation problems are dynamic, this approach is not entirely satisfactory. For example, in some cathode activation problems when the CRT is blanked and then turned back on, there will be an overshoot in the cathode's drive capability which then settles down to the level expected. Later the cathode may drop back down into a second state where its performance is less than that expected. If the time period for these changes is relatively short, the non-continuous sampling approach described above can only make one correction overall during this entire process. The overshoot and undershoot will still occur and the system will not sense or correct for it.

Thus it would be desirable to provide an improved CRT compensation system for correcting the transfer function of a CRT to more closely approximate the ideal transfer function. It would also be desirable to provide such a system which compensates for an incorrect cathode current continuously so that short lived effects can be corrected for. It would also be desirable to provide such a system which improves the tracking between individual colors in a multi CRT system. Also it would be desirable to provide a CRT compensation circuit with the above feature which is low cost and easily implemented in mass produced CRT systems.

SUMMARY OF THE INVENTION

Pursuant to the present invention a CRT compensation circuit is provided. This CRT compensation system operates continuously to monitor and correct deviations in the cathode current in the ideal transfer function. In accordance with a first embodiment of the present invention the system includes a video amplifier which receives a video voltage $V_K$ and amplifies it. A CRT receives the amplified video voltage and produces a cathode current $I_K$ in response to the video voltage. This current $I_K$ is the result of the actual transfer function of CRT which may deviate from the desired transfer function. The video voltage $V_K$ and the cathode current $I_K$ are sensed by a cathode stabilizer which generates an error signal $V_{err}$. This error signal is proportional to the deviation of $I_K$ from the cathode current which would be produced by the desired transfer function of the received $V_K$. The system then drives the CRT using the $V_{err}$ to produce the desired $I_K$ in response to the actual $V_K$. In this way the CRT is driven to produce a corrected cathode current which is closer to the desired transfer function of the $V_K$. Furthermore, the system operates continuously so that short lived cathode effects are sensed and corrected for in real time.

BRIEF DESCRIPTION OF THE DRAWINGS

The various advantages of the present invention will become apparent to one skilled in the art by reading the following specification and by reference to the following drawings in which:

FIG. 4A is a table of data of cathode current over time for a compensated and uncompensated cathode.

DESCRIPTION OF THE PREFERRED EMBODIMENTS

Figure 1:
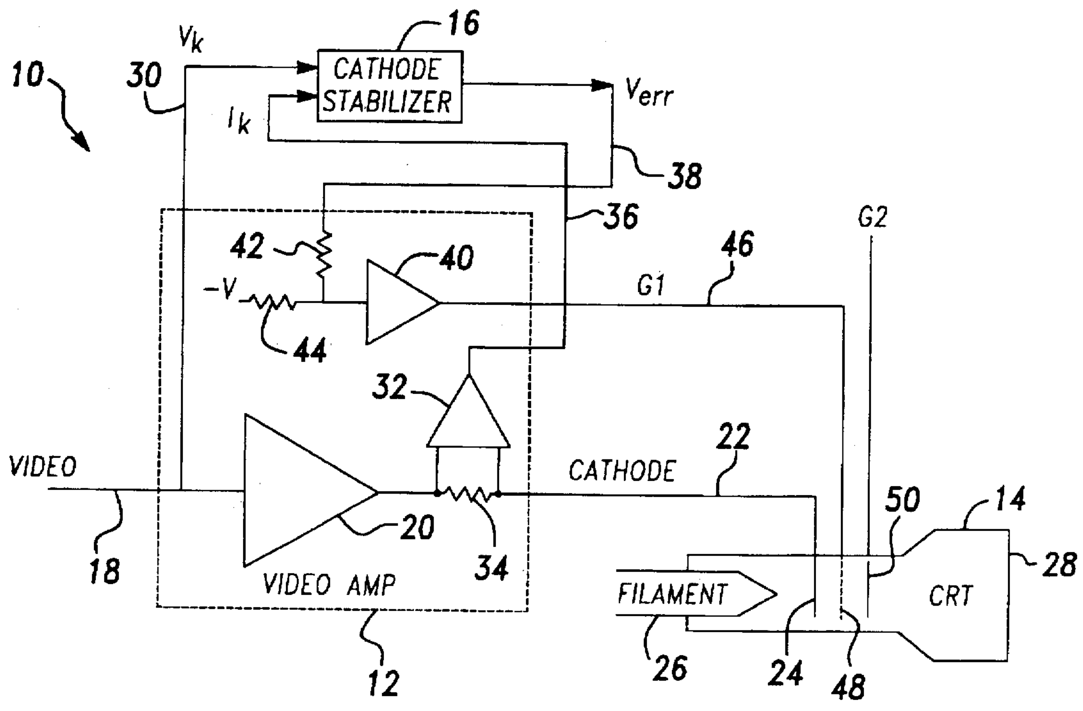
FIG. 1 is a block diagram of the overall CRT compensation system in accordance with the present invention.

A preferred embodiment of the CRT compensation system 10 of the present invention is shown in FIG. 1. The system includes a conventional video amplifier 12, a conventional CRT 14 and a cathode stabilizer 16 which implements the techniques of the present invention. A video input signal enters the video amplifier 12 along input line 18. This signal is amplified by amplifier 20 the output of which is sent along line 22 to a cathode 24. A conventional CRT filament 26 heats cathode 24 causing it to emit electrons (not shown). The electrons are attracted toward an anode (not shown) in the direction of the CRT screen 28 due to the high voltage potential of the anode.

In accordance with the present invention, the cathode stabilizer circuit 16 senses the video input signal $V_K$ from line 18 by directing this signal along line 30 to the cathode stabilizer circuit 16 input. Also, the cathode current $I_K$ is sensed by the current flowing along line 22. That is, the emission of electrons from the cathode 24 creates a cathode current which is sensed by amplifier 32 which has its two inputs placed on the opposite ends of resistor 34 placed in series along the cathode input line 22. This amplified cathode current ($I_K$) is transmitted from the amplifier 32 to a second input of the cathode stabilizer 16 along line 36.

Cathode stabilizer 16 then uses a technique described in more detail below to generate an error voltage signal $V_{err}$ at its output along line 38. This error voltage is transmitted to amplifier 40 through resistor 42. Amplifier 40 also is coupled to a reference voltage −V through resistor 44. The amplifier 40 output is transmitted along line 46 to CRT grid one 48. This amplified error signal is then applied to grid one 48. The effect of the error signal will be to either increase or decrease the electron flow (current) from the cathode 24. The measured cathode current $I_K$ will typically deviate from the desired transfer function. It will be appreciated that the ideal transfer function for a CRT is $I_K=A*V_K^{2.2}$, where A is an amplification factor described in more detail below. As discussed above, the deviation in the cathode current from the desired or theoretical transfer function (gamma) may result from aging of the CRT or improper activation of the cathode or the cathode slump. Thus as a result of the accurate choice of the sign and magnitude of $V_{err}$ the change in voltage on grid one 48 will result in an improvement in the cathode current level to better approximate the ideal transfer function. Alternatively, the error voltage $V_{err}$ could be applied to grid two 50 in place of grid one 48 or added to the cathode voltage 24.

Figure 2:
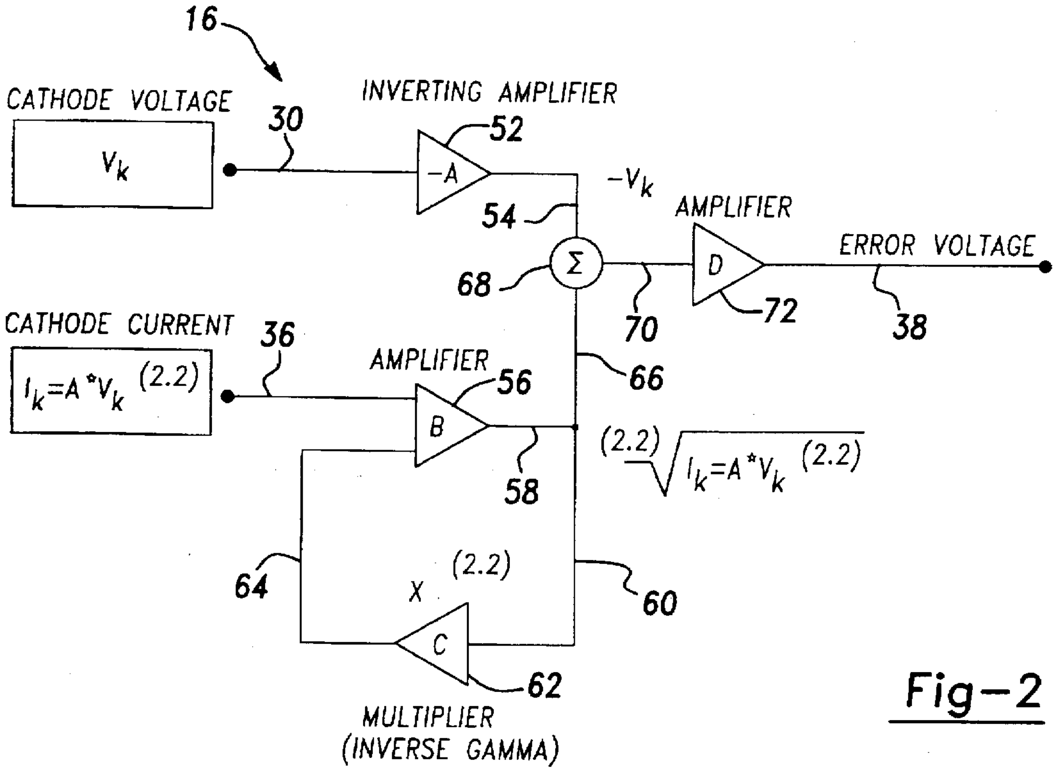
FIG. 2 is a block diagram of the cathode current stabilizer circuit for generating an error voltage utilized by the cathode compensation system of the present invention.

Referring now to FIG. 2 additional details of the cathode stabilizer unit 16 is shown. FIG. 2 shows the cathode voltage $V_K$ input 30 as well as the cathode current input $I_K$ 36, and the cathode stabilizer output $V_{err}$ as discussed above. The cathode voltage input 30 is coupled to an inverting amplifier 52 which amplifies the signal with a gain A and inverts the signal as well. Amplifier 52 also adjusts the gain and offset of the voltage term. This output is designated in FIG. 2 as $-V_K$. Cathode current input 36 is coupled to amplifier 56 which amplifies the cathode current and transmits it to output line 58. Output line 58 is coupled to a feedback loop through line 60 to a multiplier 62 which transmits its output to line 64 which directs it to a second input of amplifier 56.

The resulting output on line 66 then is combined with the amplifier 52 output on line 54 in a summing junction 68 which adds the positive voltage on line 66 with the negative voltage on line 54. The resulting voltage is the error voltage on line 70 which is amplified by line 72 and transmitted along line 38. As the error voltage $V_{err}$.

In more detail, the cathode stabilizer 16 takes the sample of the CRT cathode current $I_K$ and modifies it to produce a linear output along line 66. This linear output can then be subtracted from the input drive voltage measured $V_K$ (with adjustments for gain and offset) and the result is an error voltage which can be used to adjust the CRT and minimize the error voltage. The cathode current sample $I_K$ is modified by raising it to the 0.45 power which effectively removes the "ideal" gamma transferred function ($I_K=A*V_K^{2.2}$) to produce a linear output which can be compared to the linear output $V_K$. In other words, this process applies an inverse gamma function to the cathode current so that it can be directly compared to the voltage input.

In effect, the voltage at line 66 is the cathode input voltage which would have produced the measured cathode current in an ideal CRT. Since the CRT is not ideal, a different $V_K$ along line 54 actually produced the measured cathode current. Thus, the difference between the actual voltage $V_K$ 54 and the derived voltage on line 66 represents the error in the CRT gamma function. This error can be used to correct the cathode current by driving the cathode in the desired direction and amount.

It should be noted that because the relationship between the cathode current and the cathode voltage is a nonlinear "power" term, this nonlinear relationship must be compensated or corrected before the two input may be compared. In the preferred embodiment, this is accomplished by using a nonlinear element multiplier 62 ($X^{2.2}$) in the feedback loop of amplifier 56. In this way the function $I_K=A*(V_K)^{2.2}$ is changed to $(I_K)^{1/2.2}=[A*(V_K)^{2.2}]^{1/2.2}$ or $(I_K)^{1/2.2}=A^{1/2.2}*(V_K)$. The voltage output on line 66 can be described by the expression shown in FIG. 2.

As a result, the output of amplifier 56 on line 58 is directly proportional to the voltage input which would occur if the CRT were following the theoretical drive curve. The difference between amplifier 52 output (the desired voltage) and amplifier 56 output (the theoretical $V_K$ which would have produced the measured $I_K$ in an ideal CRT) represents the error voltage $V_{err}$. This is amplified by amplifier 72. This output is then applied to the grid one element 48 of the CRT 14 to correct the cathode current.

Figure 3:
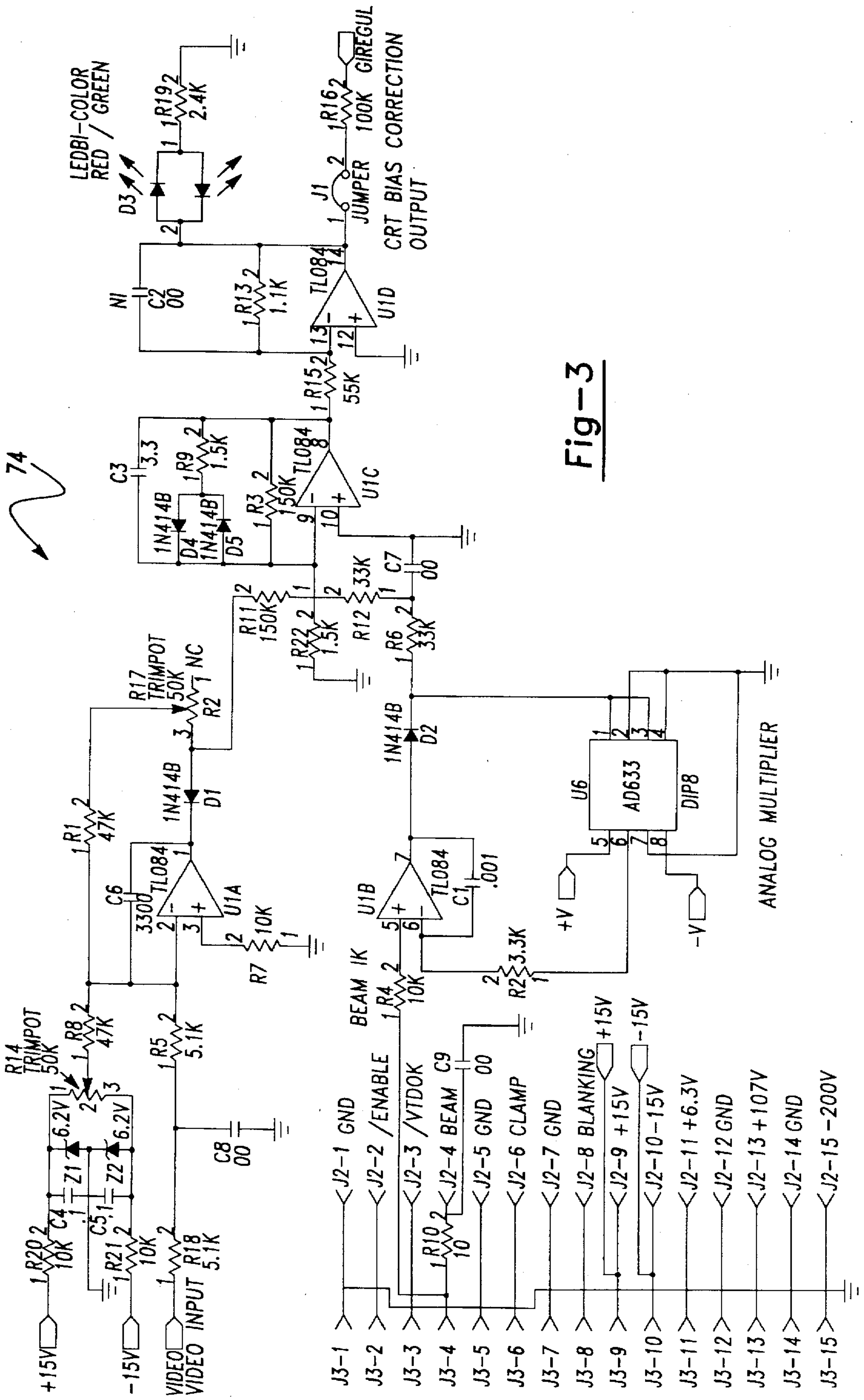
FIG. 3 is a circuit diagram of a preferred embodiment of the cathode current stabilizer circuit shown in FIG. 2.

FIG. 3 is a schematic diagram of a preferred embodiment of the cathode stabilizer circuit 16. It will be appreciated that this circuit 74 utilizes an analog multiplier designated AD633 which is manufactured by Analog Devices of Norwood, Mass. This analog multiplier chip is set up as a squaring circuit to produce a correction of 0.5 power rather than 0.45 as theoretically required. This circuit will still maintain all the same benefits except that the resulting gamma transfer function of the system would then become $I_K=A*V_K^{2.0}$. If the more exact gamma is desired a circuit topology for a power of 0.45 could also be utilized.

Figure 4B:
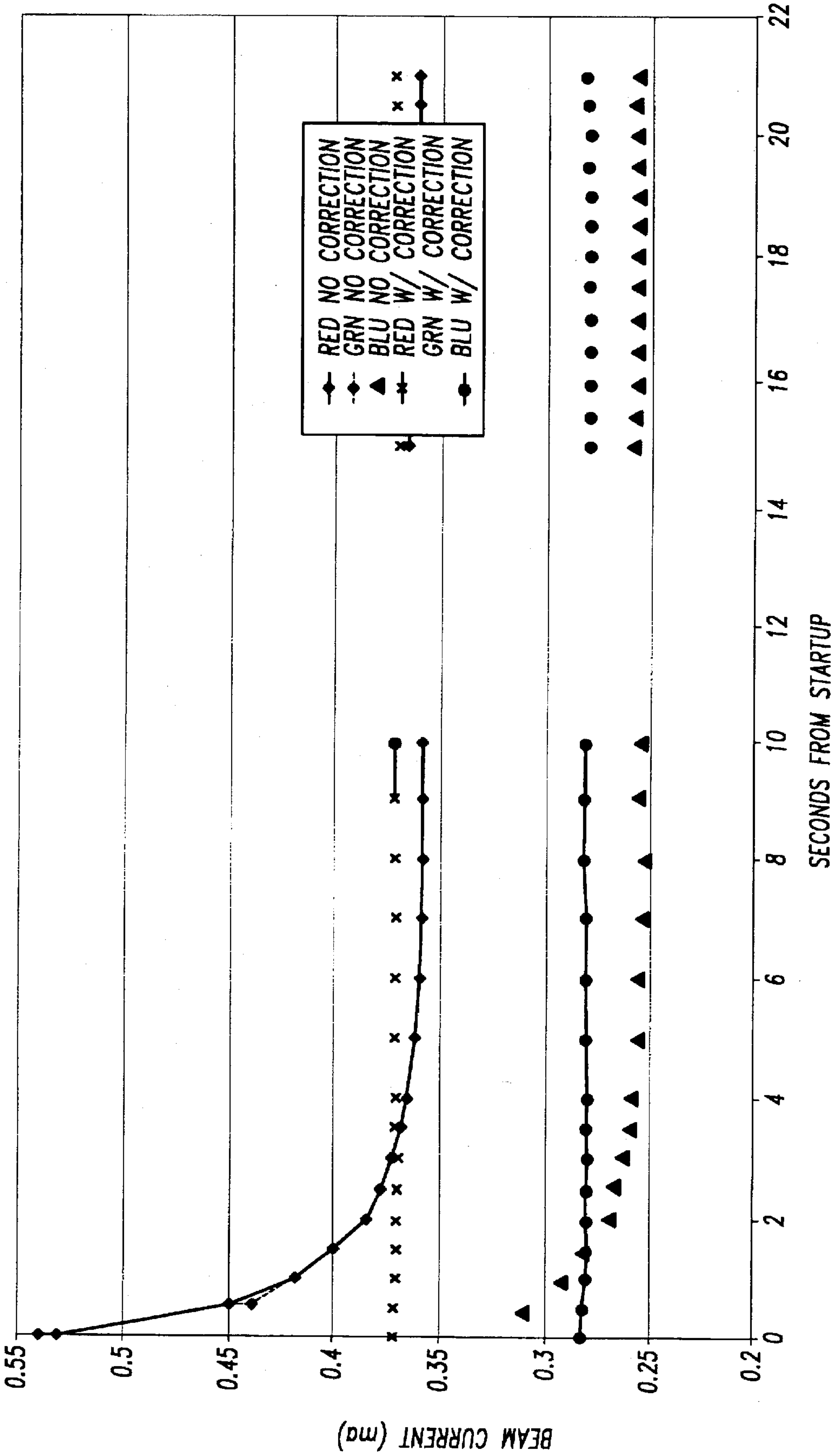
FIG. 4B is a graph of data indicating cathode current over time, with and without correction in accordance with the present invention.

FIG. 4A depicts an example of data of cathode currents with and without correction over time. This data in FIG. 4A is graphed as illustrated in FIG. 4B. It can be seen from the graph that in this example uncorrected cathode current will degrade significantly in the first few seconds after start up.

Furthermore, additional long term degradation may be seen beyond the data shown in FIG. 4. However, the data with correction indicate that by utilizing the above described techniques of the present invention, a relatively constant level of cathode current is achieved throughout.

It will be appreciated that the techniques of the present invention may be employed in numerous variations. For example, the exact point of sensing the cathode voltage and cathode current can be varied. For example, the cathode current could be sensed directly at the cathode element. However, it has been found that this location is more sensitive. Other variations which may be employed include, for example feeding the $V_{err}$ to the grid 2 or the cathode itself (opposite polarity.

From the foregoing it can be seen that the present invention provides a cathode stabilizing CRT compensation system which operates continuously to correct the cathode current on a real time basis. Further, the system is relatively easy and inexpensive to construct. Those skilled in the art can appreciate that other advantages can be obtained from the use of this invention and that modification may be made without departing from the true spirit of the invention after studying the specification, drawings and following claims.

What is claimed is:

1. A CRT compensation system comprising:

means for receiving an input video voltage signal, $V_k$;

video amplifier means for receiving said video voltage and amplifying it;

CRT receiving said amplified video voltage, said CRT producing a cathode current $I_k$ in response to said video voltage $V_k$, said cathode current $I_k$ representing an actual transfer function of $V_k$ that deviates from a desired transfer function;

means for sensing said cathode current $I_k$;

cathode stabilizer means for generating an error signal $V_{err}$ which is proportional to said deviation of $I_k$ from the cathode current which would be produced by said desired transfer function of the received $V_k$; and means for continuously driving the CRT using said $V_{err}$ to produce said desired $I_k$ in response to $V_k$, whereby a corrected cathode current is produced in real time which is closer to said desired transfer function of the $V_k$.

2. The CRT compensation system of claim 1 wherein said desired function is $I_k = A*V_k^{2.2}$ where A is an amplification factor of said $V_k$, said amplification factor A is generated by said cathode stabilizer circuit.

3. The CRT compensation system of claim 2 wherein said cathode stabilizer means comprises:

means for modifying said cathode current with an inverse function to produce a voltage $V_K'$ having a linear relationship with $V_K$; and means for determining the difference between said $V_K'$ and $V_K$, said difference comprising said error voltage $V_{err}$.

4. The CRT compensation system of claim 3 wherein said inverse function is described by expression:

$$(I_K)^{1/2.2} = A^{1/2.2} * V_K.$$

5. The CRT compensation system of claim 1 wherein said CRT includes a control grid receiving said error voltage, said error voltage is applied to said control grid to compensate said CRT.

6. The CRT compensation system of claim 3 wherein said cathode stabilizer means further comprises a first amplifier receiving said cathode current and also a multiplier circuit coupled to a feedback loop between said first amplifier output and said first amplifier input, wherein said first amplifier output represents a voltage which would have produced the measured $I_K$ if the CRT had produced the ideal transfer function.

7. The CRT compensation system of claim 6 wherein said cathode stabilizer further comprises a second amplifier receiving said cathode voltage $V_K$ and amplifying said $V_K$ by a gain of A.

8. The CRT compensation system of claim 7 wherein said second amplifier inverts said cathode voltage $V_K$.

9. The CRT compensation system of claim 6 further comprising a third amplifier coupled to the output of said means for determining the difference between $V_K'$ and $V_K$.

10. A method for compensating a CRT, said method comprising:

a.) receiving an input video voltage signal $V_k$ by a CRT;

b.) producing in said CRT a cathode current $I_k$ in response to said signal $V_k$, said current $I_k$ being an actual transfer function of the signal $V_k$ which deviates from a predetermined ideal transfer function;

c.) sensing said video signal $V_k$ and said $I_k$;

d.) generating an error voltage $V_{err}$ which is proportion to the deviation of $I_k$ from the cathode current which would have been produced by a CRT generating said desired transfer function; and e.) continuously driving said CRT using said $V_{err}$ to produce a desired $I_k$ in response to the video signal $V_k$, whereby a corrected cathode current is produced in real time which is closer to said desired transfer function.

11. The method of claim 10 wherein said step of generating an error signal utilizes as the desired transfer function the expression $I_K = A*V_K^{2.2}$ where A is an amplification factor applied to $V_K$.

12. The method of claim 10 wherein said step of generating an error voltage comprises the steps of:

modifying said cathode current with an inverse gamma function to achieve a linear output; and computing the difference between said linear output and said video voltage $V_k$, said difference between said linear output and said video voltage comprising said error voltage $V_{err}$.

13. The method of claim 12 wherein said step of modifying said cathode current utilizes as the desired inverse gamma function the expression $(I_k)^{1/2.2} = A^{1/2.2} * V_k$ where A is an amplification factor applied to $V_k$.

14. The method of claim 10 further comprising the step of applying said error voltage to a control grid in said CRT.

15. The method of claim 10 further comprising the steps of:

amplifying said cathode current $I_k$ in a first amplifier to produce a first amplifier output; and multiply said first amplifier output in a feedback loop coupled to said first amplifier.

16. The method of claim 15 further comprising the step of amplifying and inverting said cathode voltage $V_K$ by a second amplifier with a gain of A.

17. The method of claim 16 further comprising the step of amplifying said $V_{err}$ using a third amplifier.

* * * * *